(12) United States Patent
Wang

(10) Patent No.: US 6,614,649 B1
(45) Date of Patent: Sep. 2, 2003

(54) KEYBOARD STRUCTURE OF PERSONAL DIGITAL ASSISTANT (PDA)

(76) Inventor: Sen-Cheng Wang, 8F, No. 61-8, Ghing Ping Rd., Chung-Ho, Taipei Hsien (TW)

( * ) Notice: Subject to any disclaimer, the term of this patent is extended or adjusted under 35 U.S.C. 154(b) by 407 days.

(21) Appl. No.: 09/661,783

(22) Filed: Sep. 14, 2000

(51) Int. Cl.[7] ................................................. G06F 1/16
(52) U.S. Cl. ........................ 361/680; 361/683; 341/22; 400/82; 400/682; 345/172
(58) Field of Search .................................. 361/680, 681, 361/683; 341/22; 400/489, 682, 691–693, 82, 88; 345/169, 168, 172

(56) References Cited

U.S. PATENT DOCUMENTS

| | | | | |
|---|---|---|---|---|
| 5,712,760 A | * | 1/1998 | Coulon et al. | 361/680 |
| 5,841,635 A | * | 11/1998 | Sadler et al. | 361/680 |
| 5,941,648 A | * | 8/1999 | Robinson et al. | 400/82 |
| 6,168,331 B1 | * | 1/2001 | Vann | 400/472 |
| 6,457,996 B1 | * | 10/2002 | Shih | 361/680 |

FOREIGN PATENT DOCUMENTS

GB    2368746 A   *   5/2002   ............ H04M/1/02

* cited by examiner

Primary Examiner—Darren Schuberg
Assistant Examiner—Lisa Lea-Edmonds
(74) Attorney, Agent, or Firm—Birch, Stewart, Kolasch & Birch, LLP

(57) ABSTRACT

The main structure of a keyboard of PDA includes a case, a key set, function keys, a circuit board, and a PDA support frame. The device is characterized in that the case opens to the left and to the right and is a rectangle that contains the key set. The key set has two parts fitted at the bottom of the case and on the inner side of the cover respectively. One of the parts can slide inside the case to integrate with the other part for easy operation. They can also be folded so that the case becomes smaller and convenient for carrying.

4 Claims, 5 Drawing Sheets

KEYBOARD STRUCTURE OF PERSONAL DIGITAL ASSISTANT (PDA)

BACKGROUND OF THE INVENTION

1. Field of the Invention

The present invention relates to a keyboard, more particularly, to a keyboard made of a personal digital assistant (PDA) that the number and area of keys are more and wider than known PDA keyboards. After being folded up, the area of the mass is only half of the whole keyboard structure, which makes the PDA keyboard easier to carry and use.

2. Description of Invention

A conventional keyboard of personal digital assistant (PDA), as shown in FIG. 5, includes a PDA keyboard that looks like an electronic dictionary or a calculator, which is oblong. The long side of the case (a) is used as a hinge and the cover (a1) can be turned over backwards. On the inner side of the bottom (a2) of the case (a), a complete keyboard (b) is fitted and there is also a signal connector (c). When being used, the PDA (d) is plugged into the connector (c) so that users can key in data by keyboard (b) to transmit information into the PDA (d).

As shown in FIG. 5, for accommodating enough keys with proper key size, the surface area of the case (a) of traditional PDA keyboard is much larger than that of PDA (d) thus the keyboard is not easy to carry. However, if the keyboard layout and key size are too small, this will lead to inconvenience of operation and will not be practical. The high portability and easy operation are compromised when the surface area of the PDA keyboard is increased.

SUMMARY OF THE INVENTION

It is therefore a primary object of the present invention to provide a foldable PDA keyboard, which can be folded from both sides to reduce surface area for providing users better portability. When being opened for use, the keys on keyboard are larger and thus easier to operate.

In order to reach the above-mentioned object, the present invention mainly consists of a case, a key set, function keys, a circuit board and a PDA support frame. The characteristic of the device is that the case can be opened to the left and to the right, and it is a rectangle that contains the keyboard. The keyboard has two parts arranged at the bottom of the case and on the inner side of the cover. One of the parts can slide inside the case to integrate with the other part of the keyboard.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
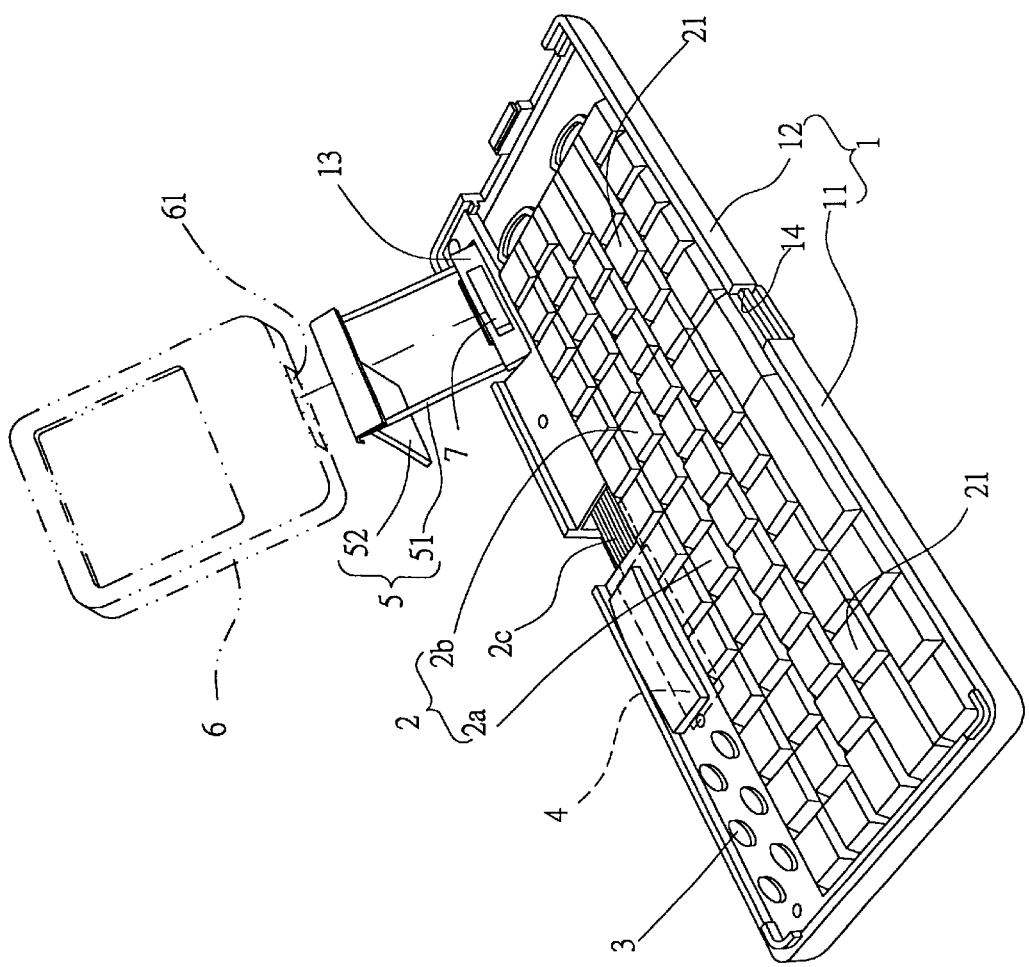
FIG. 1 is a three-dimensional view of the present invention.
Figure 2:
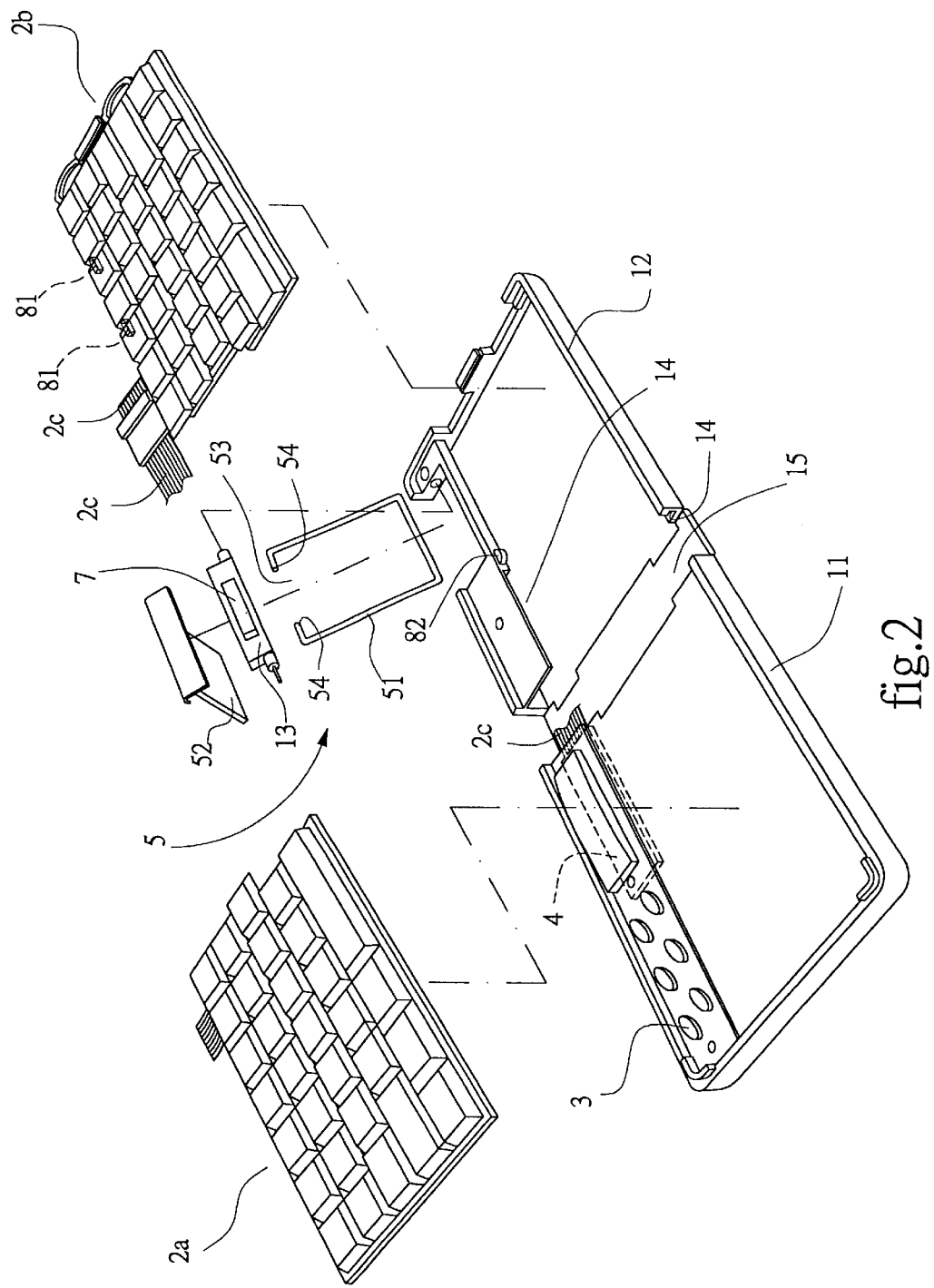
FIG. 2 is an explosive view of the present invention.

With reference to FIGS. 1 and 2, the present invention mainly includes a case 1, a key set 2, function keys 3, a circuit board 4 and a PDA support frame 5. On the case 1, there is an invisible PDA support frame 5 which supports all the parts—the key set 2, function keys 3 and the circuit board 4. The key set 2 contains a plurality of character and numeric keys 21. The characteristic of the device is:

the case 1 can be opened to both directions—left or right, and it is a rectangle that contains a key set 2 thereof. The key set 2 has two parts (2a and 2b), located at the base 11 of the case 1 and on the inner side of the cover 12 respectively. Either part of the key set (2a or 2b) can slide inside the case (11 or 12) and. integrate with the other to constitute a complete key set 2.

Please refer to FIG. 2, on the right side of the case (cover 12), there are sliding slots 14 disposed on the inner side of the two lateral sides thereof. The right half of the keyboard section 2b is inserted inside the sliding slot 14. The keyboard section 2b is connected to the other part of the keyboard section 2a via a flexible circuit board 2c. Therefore the circuit of the keyboard section is intact while the keyboard section 2b is moveable.

Moreover, an indented hole 81 and a resilient button 82 (as shown in FIG. 2) are mounted on the keyboard section 2b and the cover 12 respectively to make the keyboard section 2b click into place when being moved.

Again refer to FIGS. 1 and 2, the PDA support frame 5 is sandwiched inside the right case (cover 12), with a line frame 51 and a supporting board 52. The line frame 51 is a U shape. The open-end 53 goes through the two ends of a connector body 13, and it can be drawn out or inserted. Then the line frame near the open-end is bent into a hook 54 to fit with the supporting board 52. The connector body 13 is hinged on the cover 12 by using the long axis thereof as a center. When the invention is unfolded, the line frame 51 and the supporting board 52 can be pulled out and rotated to form a upside-down V shape. Then the personal digital assistant (PDA) 6 can be positioned on the support frame 5 and powered by the connector 61 on the bottom connecting with the connector 7.

Figure 3:
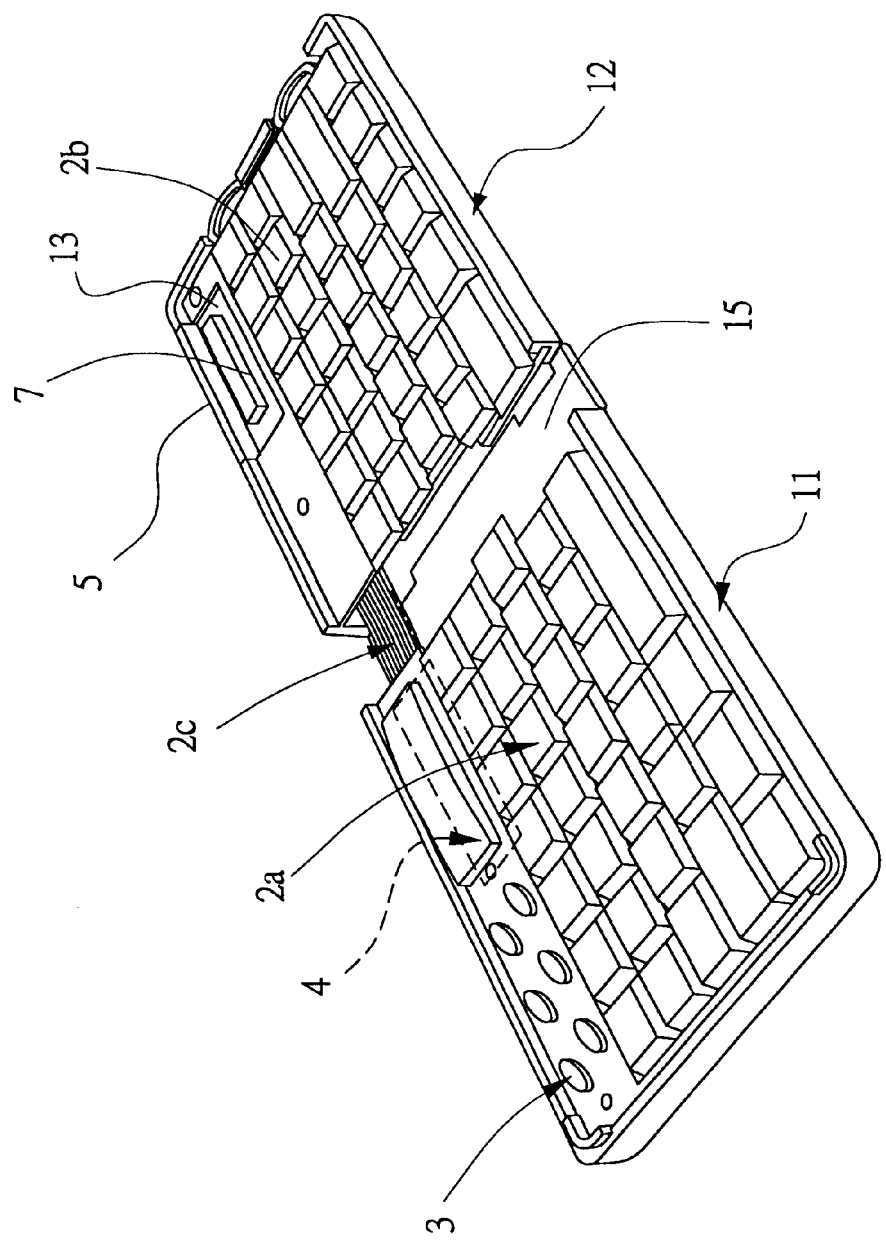
FIG. 3 demonstrates the key set of the present invention in separated status.
Figure 4:
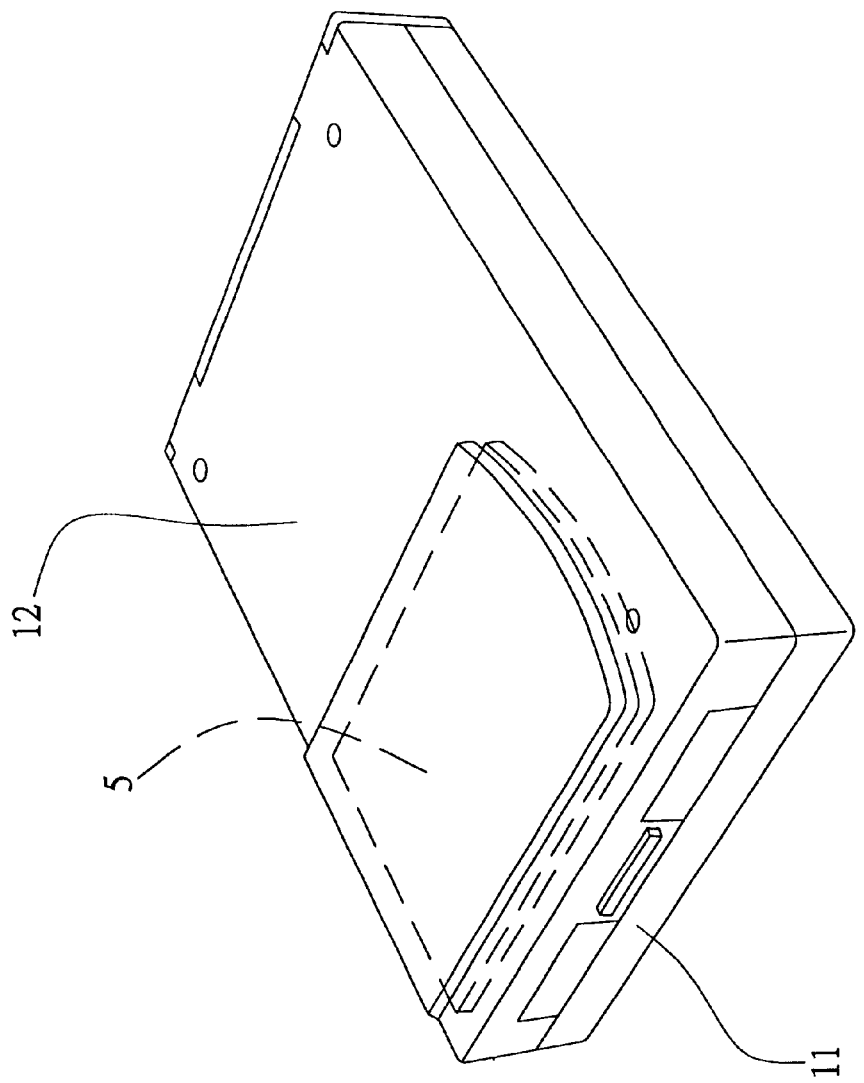
FIG. 4 demonstrates the keyboard structure of the present invention in folded condition.
Figure 5:
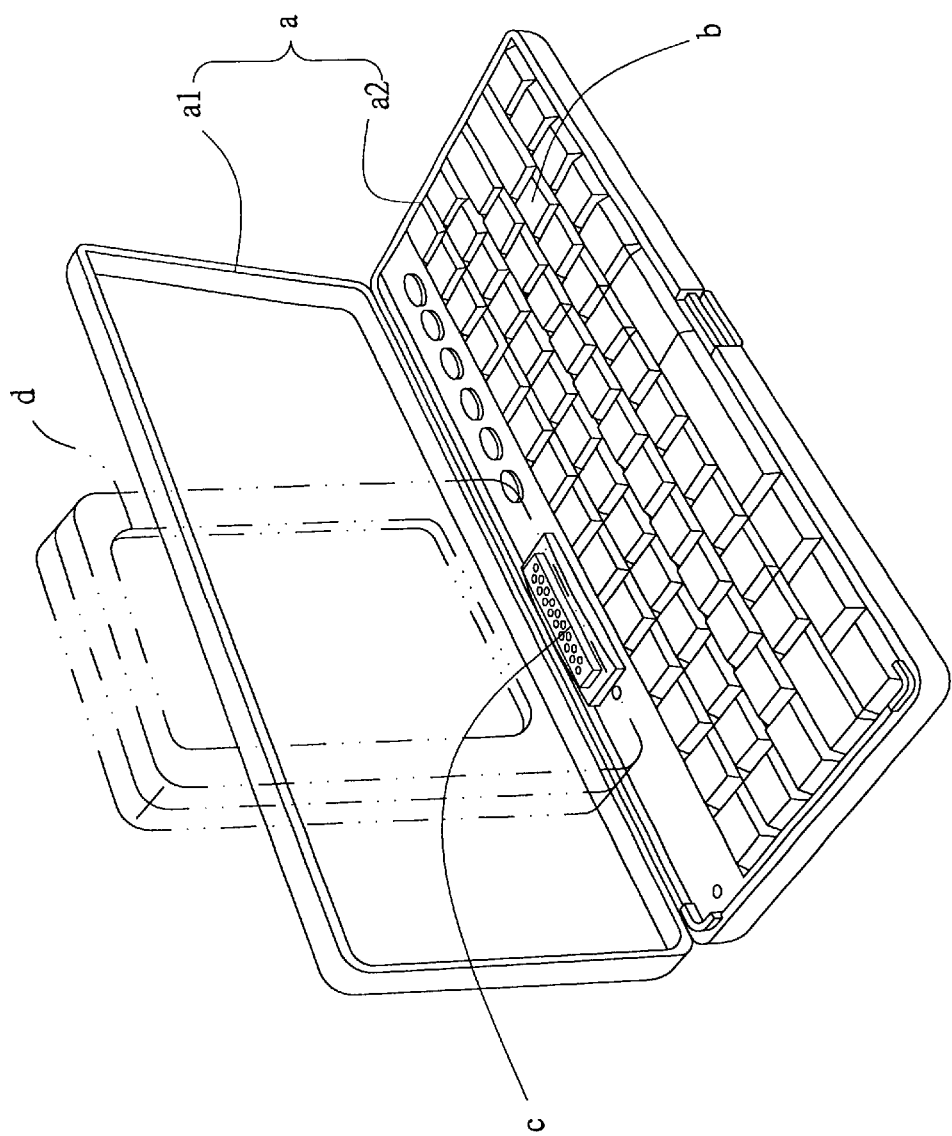
FIG. 5 is a three-dimensional diagrammatic sketch of the prior art PDA keyboard structure.

In accordance with the structure mentioned above, since the whole key set 2 of the device is separated into two keyboard sections 2a and 2b, there is a folding space 15 between the base 11 and the cover 12 of the case 1 (as shown in FIG. 3). Then the cover 12 on the right side can be folded into the left side and overlapped with the base 11 (as shown in FIG. 4). Therefore, after being folded up, the surface area of the present invention is only about half of the area of the original key set 2, and this is much smaller than the traditional PDA keyboard structure. In addition, the area of each key 21 and their distances can be enlarged and wider without compromising the portability due to the smaller size, and this will make the operation of the keyboard easier.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A PDA keyboard comprising a rectangular case, a key set, function keys, a circuit board and a PDA support frame, the case being openable to both the left and the right and containing said key set thereof while said key set includes two parts that are mounted on a base of said case and an inner side of a cover of said case respectively; wherein one of the parts of said key set can slide inside said case and integrate with the other part to form an integrated keyboard.

2. The PDA keyboard as claimed in claim 1, wherein two parts of said key set mounted on two sides of said case respectively are connected by a flexible circuit board so as to form a certain distance between the two parts of said key set.

3. The PDA keyboard as claimed in claim 1, wherein an indented hole and a flexible button are fitted on said key set and the inner side of said case respectively in order to position said key set when being moved.

4. The PDA keyboard as claimed in claim 1, wherein said PDA support frame is disposed inside a lateral side of said case and having a U-shaped line frame and a supporting board while an open-end of said line frame goes through the two sides of a connector body; for being drawn out or inserted in; said line frame near the open-end is bent to form a hook for fixing with said supporting board; said connector body is hinged on said case with a long axis as thereof; when being unfolded, said line frame and said supporting board are pulled out and rotated to form an upside-down V shape so that a personal digital assistant (PDA) can be positioned on said support frame and powered by a connector on the bottom thereof connecting with said connector body.

* * * * *